(12) United States Patent
Warmenhoven et al.

(10) Patent No.: US 11,184,255 B2
(45) Date of Patent: Nov. 23, 2021

(54) SYSTEM FOR PREPARING NETWORK TRAFFIC FOR FAST ANALYSIS

(71) Applicant: BITDEFENDER NETHERLANDS B.V., The Hague (NL)

(72) Inventors: Adrianus Warmenhoven, The Hague (NL); Rick Hofstede, The Hague (NL)

(73) Assignee: Bitdefender Netherlands B.V., The Hague (NL)

( * ) Notice: Subject to any disclaimer, the term of this patent is extended or adjusted under 35 U.S.C. 154(b) by 0 days.

(21) Appl. No.: 16/475,211

(22) PCT Filed: Nov. 17, 2017

(86) PCT No.: PCT/IB2017/057197
§ 371 (c)(1),
(2) Date: Jul. 1, 2019

(87) PCT Pub. No.: WO2018/122640
PCT Pub. Date: Jul. 5, 2018

(65) Prior Publication Data
US 2019/0342190 A1    Nov. 7, 2019

Related U.S. Application Data

(60) Provisional application No. 62/440,836, filed on Dec. 30, 2016.

(51) Int. Cl.
*H04L 12/26* (2006.01)
(52) U.S. Cl.
CPC ............ *H04L 43/026* (2013.01); *H04L 43/04* (2013.01); *H04L 43/062* (2013.01); *H04L 43/18* (2013.01)

(58) Field of Classification Search
CPC ......... H04L 47/31; H04L 47/12; H04L 47/56; H04L 47/115; H04L 43/026; H04L 12/26; H04L 63/1408; H04L 51/30; H04L 41/60; H04L 67/42; H04L 63/145
See application file for complete search history.

(56) References Cited

U.S. PATENT DOCUMENTS

| | | | |
|---|---|---|---|
| 7,523,156 B2* | 4/2009 | Giacalone, Jr. | G06Q 30/02 709/201 |
| 7,779,350 B2* | 8/2010 | Bender | G06F 40/143 715/235 |
| 8,125,920 B2 | 2/2012 | Aitken | |

(Continued)

OTHER PUBLICATIONS

Claise B et al, "Information Model for IP Flow Information Export (IPFIX); rfc7012.txt", Internet Engineering Task Force, IETF; Standard, Internet Society (ISOC) 4, Rue Des Falaises CH—1205 Geneva, Switzerland, (Sep. 16, 2013), pp. 1-24, XP015094959.

(Continued)

*Primary Examiner* — Sargon N Nano
(74) *Attorney, Agent, or Firm* — Law Office of Andrei D Popovici, PC

(57) ABSTRACT

A system and method for preparing network flows for analysis by decomposing such flows into a plurality of elements which are then tagged. Tagged elements may optionally comprise any type of element according to any type of network flow standard, including but not limited to the IPFIX or Netflow standards, or may optionally be derived from such elements.

26 Claims, 9 Drawing Sheets

(56) References Cited

U.S. PATENT DOCUMENTS

| | | | | |
|---|---|---|---|---|
| 8,588,069 B2* | 11/2013 | Todd | ............... | H04L 41/142 370/232 |
| 8,756,185 B2* | 6/2014 | Dawson | ............... | G06N 5/022 706/45 |
| 10,193,783 B2* | 1/2019 | Behera | ............... | H04L 43/0882 |
| 10,862,854 B2* | 12/2020 | Mircescu | ............... | H04L 51/12 |
| 2002/0027906 A1* | 3/2002 | Athreya | ............... | H04L 12/4645 370/386 |
| 2009/0168648 A1* | 7/2009 | Labovitz | ............... | H04L 43/0876 370/229 |
| 2011/0093916 A1* | 4/2011 | Lang | ............... | G06F 21/57 726/1 |
| 2012/0311132 A1* | 12/2012 | Tychon | ............... | H04L 43/026 709/224 |
| 2013/0041934 A1* | 2/2013 | Annamalaisami | ............... | H04L 47/2483 709/203 |
| 2013/0117847 A1* | 5/2013 | Friedman | ............... | H04L 63/102 726/22 |
| 2014/0136680 A1* | 5/2014 | Joshi | ............... | H04L 43/026 709/224 |
| 2014/0303934 A1* | 10/2014 | Mylarappa | ............... | G06F 11/3495 702/186 |
| 2014/0304393 A1* | 10/2014 | Annamalaisami | ............... | H04L 67/146 709/224 |
| 2016/0294870 A1* | 10/2016 | Banerjee | ............... | H04L 43/0876 |
| 2017/0093681 A1* | 3/2017 | Chaubey | ............... | H04L 67/2804 |
| 2017/0214701 A1* | 7/2017 | Hasan | ............... | H04L 63/1491 |
| 2018/0035400 A1* | 2/2018 | Sullivan | ............... | H04W 64/00 |
| 2019/0342190 A1* | 11/2019 | Warmenhoven | ............... | H04L 43/04 |
| 2020/0028857 A1* | 1/2020 | Warmenhoven | ............... | H04L 51/30 |
| 2020/0259726 A1* | 8/2020 | Barsheshet | ............... | H04L 43/028 |

OTHER PUBLICATIONS

Hofstede Rick et al, "Flow Monitoring Explained: From Packet Capture to Data Analysis With NetFlow and IPFIX", IEEE Communications Surveys & Tutorials, (May 12, 2014), vol. 16, No. 4, doi:10.1109/COMST.2014.2321898, pp. 2037-2064, XP011565151.

* cited by examiner

Second module tagging

| Row Number | Source IP Address | Source Port | Destination IP Address | Destination Port | Bytes sent | Bytes received |
|---|---|---|---|---|---|---|
| 0 | 10.0.8.4 | 6472 | 8.8.8.8 | 53 | 510 | 2046 |
| 1 | 10.2.10.2 | 3459 | 194.109.6.66 | 143 | 2148 | 1987625 |
| 2 | 10.16.42.10 | 3211 | 31.25.99.5 | 22 | 16800 | 209831 |
| 3 | 10.0.8.4 | 9910 | 10.0.9.60 | 389 | 4901 | 8192 |
| 4 | 10.0.9.212 | 1099 | 50.60.70.80 | 6667 | 10988739 | 100287 |
| ... | | | | | | |

| Destination Geolocation | Frequency |
|---|---|
| US, California, Mountain View | 827738 |
| NL, Noord-Holland, Amsterdam | 3049 |
| NL, Zeeland, Middelburg | 324 |
| Private | 19002 |
| US, New Jersey, Clifton | 1 |
| ... | |

(49)

Third module tagging

| Row Number | Source IP Address | Source Port | Destination IP Address | Destination Port | Bytes sent | Bytes received |
|---|---|---|---|---|---|---|
| 0 | 10.0.8.4 | 6472 | 8.8.8.8 | 53 | 510 | 2046 |
| 1 | 10.2.10.2 | 3459 | 194.109.6.66 | 143 | 2148 | 1987625 |
| 2 | 10.16.42.10 | 3211 | 31.25.99.5 | 22 | 16800 | 209831 |
| 3 | 10.0.8.4 | 9910 | 10.0.9.60 | 389 | 4901 | 8192 |
| 4 | 10.0.9.212 | 1099 | 50.60.70.80 | 6667 | 10988739 | 100287 |
| ... | | | | | | |

| Destination Geolocation | Frequency | Traffic ratio |
|---|---|---|
| US, California, Mountain View | 827738 | 249267 |
| NL, Noord-Holland, Amsterdam | 3049 | 1081 |
| NL, Zeeland, Middelburg | 324 | 80064 |
| Private | 19002 | 598267 |
| US, New Jersey, Clifton | 1 | 109572916 |
| ... | | |

Fourth module tagging (51)

| Row Number | Source IP Address | Source Port | Destination IP Address | Destination Port | Bytes sent | Bytes received |
|---|---|---|---|---|---|---|
| 0 | 10.0.8.4 | 6472 | 8.8.8.8 | 53 | 510 | 2046 |
| 1 | 10.2.10.2 | 3459 | 194.109.6.66 | 143 | 2148 | 1987625 |
| 2 | 10.16.42.10 | 3211 | 31.25.99.5 | 22 | 16800 | 209831 |
| 3 | 10.0.8.4 | 9910 | 10.0.9.60 | 389 | 4901 | 8192 |
| 4 | 10.0.9.212 | 1099 | 50.60.70.80 | 6667 | 10988739 | 100287 |
| ... | | | | | | |

| Destination Geolocation | Frequency | Traffic ratio | Anomalous |
|---|---|---|---|
| US, California, Mountain View | 827738 | 249267 | 0 |
| NL, Noord-Holland, Amsterdam | 3049 | 1081 | 31 |
| NL, Zeeland, Middelburg | 324 | 80064 | 210 |
| Private | 19002 | 598267 | 2 |
| US, New Jersey, Clifton | 1 | 109572916 | 750 |
| ... | | | |

Fifth module tagging (52)

| Row Number | Source IP Address | Source Port | Destination IP Address | Destination Port | Bytes sent | Bytes received |
|---|---|---|---|---|---|---|
| 0 | 10.0.8.4 | 6472 | 8.8.8.8 | 53 | 510 | 2046 |
| 1 | 10.2.10.2 | 3459 | 194.109.6.66 | 143 | 2148 | 1987625 |
| 2 | 10.16.42.10 | 3211 | 31.25.99.5 | 22 | 16800 | 209831 |
| 3 | 10.0.8.4 | 9910 | 10.0.9.60 | 389 | 4901 | 8192 |
| 4 | 10.0.9.212 | 1099 | 50.60.70.80 | 6667 | 10988739 | 100287 |
| ... | | | | | | |

| Destination Geolocation | Frequency | Traffic ratio | Anomalous |
|---|---|---|---|
| US, California, Mountain View | 827738 | 249267 | 0 |
| NL, Noord-Holland, Amsterdam | 3049 | 1081 | 2 |
| NL, Zeeland, Middelburg | 324 | 80064 | 100 |
| Private | 19002 | 598267 | 1 |
| US, New Jersey, Clifton | 1 | 109572916 | 996 |
| ... | | | |

Figure 7 Continued

SYSTEM FOR PREPARING NETWORK TRAFFIC FOR FAST ANALYSIS

FIELD OF THE INVENTION

The present invention is of a system and method for preparing network traffic for analysis, and in particular, of such a system and method for preparing network flows for analysis.

BACKGROUND OF THE INVENTION

Network traffic needs to be analyzed for a variety of reasons.

"Flow-based Compromise Detection" (by Rick Hofstede, ISBN: 978-90-365-4066-7; 2016, referred to as "the thesis") describes one way to analyze network traffic which is different from packet based analysis. The thesis describes flow-based network analysis and some applications for detecting compromises of computational devices connected to the network. Flow-based network analysis involves the preparation and export of flows, as information relating to network behavior, in the form of flow export records.

For the process to be operative, packets are analyzed to extract information which is suitable for export as an export flow. The export flow features data from a plurality of packets. The export is performed according to an export flow protocol, including but not limited to IPFIX or Netflow. While both protocols are useful, IPFIX was developed to support for flow export from devices, or network probes, designed to forward packets. However neither protocol requires a single device to capture and analyze packets to derive the export flow.

Taking IPFIX as an example, flow information is exported in the form of information elements or IEs. The format that different IEs may take, and the type of information included, relates to standards maintained by IANA. Below is a table of some examples of acceptable flow export elements (IEs or fields). Table 1 shows non-limiting example of acceptable IANA elements of a flow.

TABLE 1

IANA elements of a flow:

| Enterprise ID | Element ID | Name | Description |
| --- | --- | --- | --- |
| 0 | 152 | flowStartMilliseconds | Timestamp of the flow's first packet. |
| 0 | 153 | flowEndMilliseconds | Timestamp of the flow's last packet. |
| 0 | 8 | sourceIPv4Address | IPv4 source address in the packet header. |
| 0 | 12 | destinationIPv4Address | IPv4 destination address in the packet header. |
| 0 | 7 | sourceTransportPort | Source port in the transport header. |
| 0 | 11 | destinatianTransportPort | Destination port in the transport header. |
| 0 | 4 | protocolIdentifier | IP protocol number in the packet header. |
| 0 | 2 | packetDeltaCount | Number of packets for the flow. |
| 0 | 1 | octetDeltaCount | Number of octets for the flow. |
| 16982 | 102 | HTTPDomain | Domain of an HTTP Request |

A flow may optionally be defined as "a set of IP packets passing an observation point in the network during a certain time interval, such that all packets belonging to a particular flow have a set of common properties", according to the IPFIX or Netflow export protocols. These export protocols define these common properties as follows: packet header fields, such as source and destination IP addresses and port numbers, interpreted information based on packet contents, and meta-information. Once a flow has terminated, then the flow is exported.

The common properties may optionally be stored as rows, in a typical database, with one column per property. The packet analysis may optionally be performed as described with regard to the above thesis.

BRIEF SUMMARY OF THE INVENTION

The present invention is of a system and method for preparing network flows for analysis, by decomposing such flows into a plurality of elements which are then tagged. Tagged elements may optionally comprise a combination of any type of element according to any type of network flow standard, including but not limited to the IPFIX or Netflow standards, or may optionally be derived from such elements, for example optionally with the addition of external (non-flow) information or by performing some type of calculation on the network flow standard element(s).

A tagged element that is derived from one or more network flow standard elements, for example according to information external to the network flow or by performing some type of calculation on the network flow standard element(s), is determined herein a simple tagged element. The tagged element is obtained from the network flow standard element(s) but is not a single network flow standard element by itself.

A non-limiting example of such a simple tagged element is a geolocation tagged element, which is derived from the IP address of an exported network flow and a look-up table. The look-up table matches the IP address to the geolocation, and is not considered to be a network flow standard element. Another non-limiting example of a simple tagged element is time lapse or duration, which may optionally be calculated from the flow start time and flow end time network flow standard elements. Another non-limiting example of a simple tagged element is calculating frequency of traffic from a particular IP address. Still another non-limiting example of such a tagged element is a traffic ratio, which is optionally derived from the amount of data sent to, and received from, a particular IP address or a particular port of particular IP address. Yet another non-limiting example of such a tagged element is a port/IP address element, which is optionally derived from a combination of the source IP address and the destination port of the network flow.

Optionally a tagged element is determined from one or more processed network flow standard elements (that is, from one or more simple tagged elements), and is termed herein a compound tagged element. A compound element may optionally comprise a combination of a plurality of simple tagged elements. Additionally or alternatively, a compound element may optionally be derived from a simple tagged element plus information external to the network flow, by performing some type of calculation on the simple tagged element, or by combining a network flow standard element with a simple tagged element (optionally further including some type of calculation or information external to the network flow).

A non-limiting example of such a compound tagged element may optionally be derived from a combination of the above described time lapse or duration simple tagged element plus another simple tagged element relating to geolocation. Another non-limiting example of such a compound tagged element may optionally be derived from counting the amount of traffic (whether in frequency, bytes or a combination thereof) to a particular geolocation.

Tagged elements may optionally also be used as building blocks to build more complex tagged elements, which are also termed herein compound elements. For example, the previously described traffic ratio may optionally be analyzed to determine which portion is from a particular port, or is being sent to a particular port on the destination IP address. Such analysis may optionally be done by combining a plurality of compound tagged elements, or a compound tagged element with a simple tagged element. Thus, tagged elements may be used in very flexible ways and may optionally be combined to create new such tagged elements.

According to at least some embodiments of the present invention, a method for analyzing network flows comprises receiving a network flow, analyzing the network flow and writing the tagged elements by column. Optionally the network flow is analyzed by row. This increases the efficacy of the process. Preferably, the method comprises analyzing the network flow to determine simpler tagged elements first, before then determining compound tagged elements. The method is preferably adjusted so that a tagging process that requires a particular tagged element is performed after the particular tagged element has been determined. Optionally, this adjustment is performed by mapping each type of tagged elements (whether simple, compound or complex) to a column of a record of such tagged elements for the network flow. Simple tagged elements are preferably mapped to columns which are to be written first, while compound tagged elements would preferably only be mapped to columns that are at least written after those columns containing simple elements that the compound tagged elements depend on. Compound tagged elements that themselves require at least one compound tagged element are preferably mapped to columns that are at least written after those columns containing compound tagged element(s) that are required, and so forth.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer or as a computational device, including but not limited to any type of personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, or a pager. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF AT LEAST SOME EMBODIMENTS

According to at least some embodiments of the present invention, there is provided a system and method for preparing network flows for analysis through tagging. There is no requirement for a priori knowledge about the flows for tagging to be successful, nor does tagging require any judgement about the meaning or implications of the flows.

Instead, tagging provides a robust, reproducible and efficient process for rapidly decomposing network flows into useful information.

Figure 1:
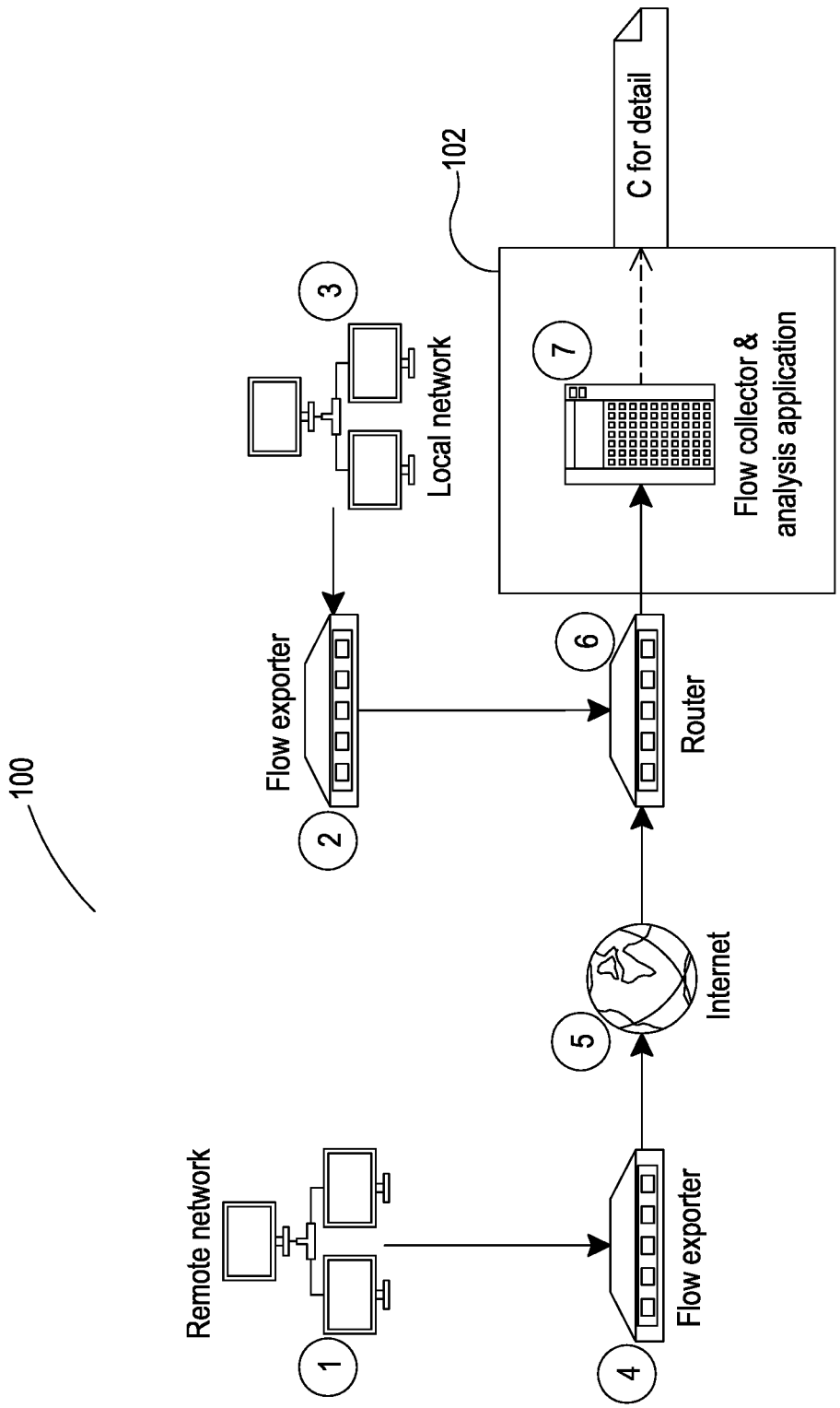
FIG. 1 shows an exemplary, non-limiting illustrative system for collecting and analyzing flows according to at least some embodiments of the present invention.

Turning now to the figures, FIG. 1 shows an exemplary, non-limiting illustrative system for collecting and analyzing flows according to at least some embodiments of the present invention. As shown in FIG. 1 there is provided a System 100, which features one or more networks through which flow data is collected. As previously described, flow data relates to data about the flow of packets through a network, or a plurality of networks. As shown, there is provided a Remote Network 1, which may optionally be connected to an appliance known as a Flow Exporter 4. Flow Exporter 4 may optionally be a dedicated appliance or device.

Alternatively, Flow Exporter 4 may be a server or other computational device which has other functions besides flow export.

As previously described, flow export optionally and preferably features collection of packet data, and then organization of the packet data into an export flow, which is then exported. Flow export optionally occurs according to one or more different protocols, including but not limited to IPFIX and/or NetFlow. The IPFIX protocol is currently known as RFC 7011, and the NetFlow protocol is known as RFC 3954. The flow data is a metadata summary, which the Flow Exporter 2 prepares using one of these flow export protocols. The flow data is preferably organized such that not all of the packet data is needed, for example optionally the flow data may only be derived from the packet headers, or from other packet behavior quantifiable packet characteristics or analysis.

Flow Exporter 4, as well as Flow Exporter 2, may optionally then prepare such data and send it on to a Flow Collector & Analysis Application 7, which is optionally and preferably operated by a Computational Device 102. Now depending upon the relative location of Computational Device 102, different connections may optionally be made between Computational Device 102, Remote Network 1, and optionally for example a Local Network 3. These connections may optionally be made through any network, including but not limited to Internet 5.

In the example shown herein for system 100, a Flow Exporter 4 communicates through Internet 5, to a Router 6. Flow Exporter 2 receives flows from and processes the data contained therein from a Local Network 3. Flow Exporter 2, and Flow Exporter 4, ultimately communicate through Computational Device 102 through a Router 6, though optionally any type of network appliance may be used to connect these different flows from these different networks, optionally including any type of communication through Internet 5.

The Flow Connector And Analysis Application 7 as shown then collects the flows and may optionally perform some type of analysis. This is described in greater detail in Diagram C.

Figure 2:
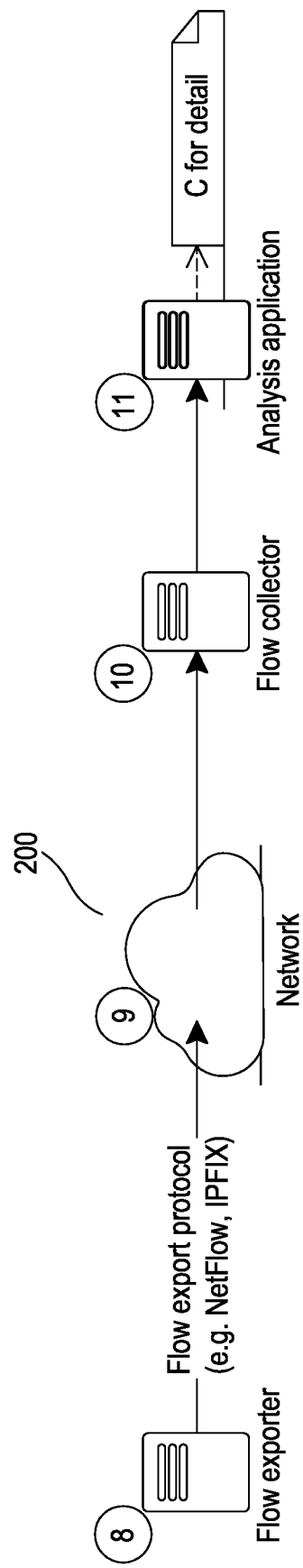
FIG. 2 shows an exemplary, non-limiting illustrative system for collecting and preparing flows according to at least some embodiments of the present invention.

FIG. 2 shows an exemplary, non-limiting illustrative system for collecting and preparing flows according to at least some embodiments of the present invention, including an Exemplary System 200, which provides additional detail with regard to analysis and preparation of the flows. In this diagram some computational devices have been eliminated for ease of explanation, however it should be noted that optionally a Flow Exporter 8, a Flow Collector 10, and an Analysis Application 11 may each optionally be implemented as a network device or appliance, and/or as a server operating any type of software, even though such devices may optionally not be shown in this case for ease of explanation.

So again, Flow Exporter 8 prepares the flows and exports them according to a flow exporter protocol, which again may optionally be NetFlow, IPFIX or any other suitable flow export protocol. The flows are then exported through a Network 9, which may optionally be the internet for example, to a Flow Collector 10.

Flow Collector 10 may optionally collect the flows from a plurality of Flow Exporters 8, which are not shown, and then sends the collected flows to an Analysis Application 11.

Flow Collector 10 may or may not optionally reside on the same host system as one or more Flow Exporters 8. So, in this case for example, Flow Collector 10 may optionally be on a different host system and/or a different network than Flow Exporters 8. Flow Collector 10 may optionally be operated on the same host system, or even by the same computational device as Analysis Application 11, or may optionally be on a different host system and/or be operated by a different computational device than Analysis Application 11. Again, further detail is shown in Diagram C, with regard to the flow collection analysis process.

Figure 3:
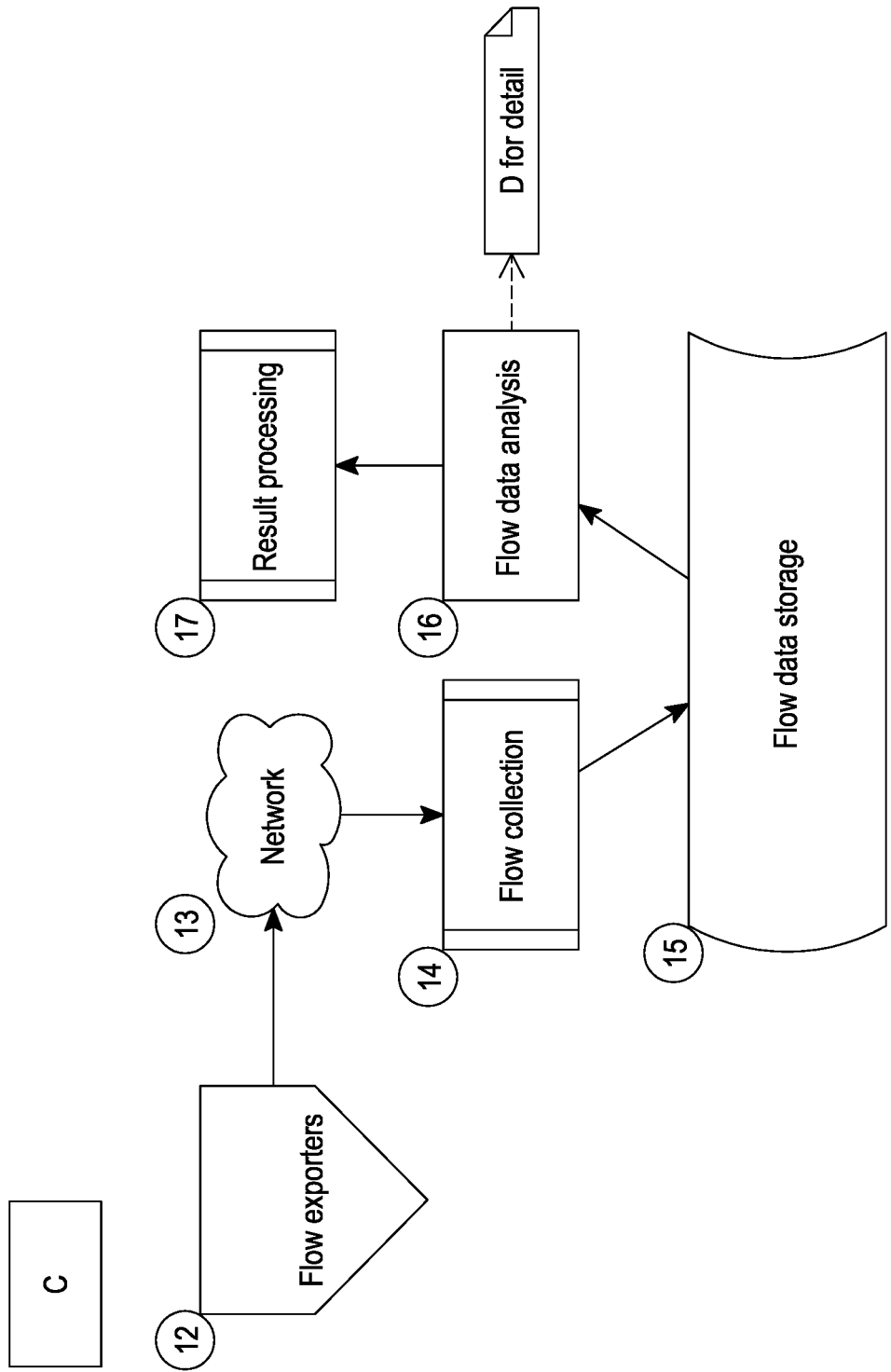
FIG. 3 shows an exemplary, non-limiting illustrative process for flow export, collection and analysis according to at least some embodiments of the present invention.

FIG. 3 relates now to Diagram C, which shows an optional process for flow export, collection and analysis according to at least some embodiments of the present invention. As shown, preferably a plurality of Flow Exporters 12 export flows through a Network 13, to a Flow Collector 14. Again as described with regard to the previous diagrams, optionally each of the Components shown here may be implemented as a stand-alone network appliance or device, or may optionally be implemented as part of a server or a group of servers, optionally as firmware or as software. Although such computational devices are not shown, they are assumed to be an inherent part of the diagram, and would in fact easily be added and understood by one of ordinary skill in the art.

So turning back to FIG. 3, the flows are collected by a Flow Collector, or Flow Collection Point 14, and are optionally and preferably placed in a Flow Data Storage 15. Flow Data Storage 15, may optionally be temporary, or a permanent type of data storage. A flow data analysis Component 16 then optionally and preferably retrieves the flows from Flow Data Storage 15, in order to perform some type of analysis. The results of the analysis may optionally be processed by a Result Processing Component 17.

Flow Data Storage 15 may optionally be implemented according to any type of storage device, including but not limited to a hard disk, SAN storage, RAM disk, any type of memory structures, queue and so forth. The results of Flow Data Analysis 16, which are sent to Result Processing Component 17, may optionally include but are not limited to alerts being sent for anomalous behavior, network routing updates, network model creation or updates, low prediction and so forth. However Flow Data Analysis 16 may optionally be agnostic as to the meaning of the analysis, such that for example Flow Data Analysis 16 may optionally not determine whether a particular flow indicates unauthorized access to some part of a computer system, the presence (or absence) of malware and the like. Optionally Flow Data Analysis 16 does not send all results to Result Processing Component 17, but rather selects those results which are most informative and/or represent some type of change in the state of the network, the network model, or the system and/or which may represent some type of alert optionally set according to predetermined rules, which may indicate a result which Result Processing Component 17 needs to examine in more detail.

Result Processing Component 17 may optionally include, but is not limited to, one or more of a malware detection application, an unauthorized access detection application or an anomaly detection application, or any type of compromise detection, in which the operation of a computer system has been compromised in some way.

Figure 4:
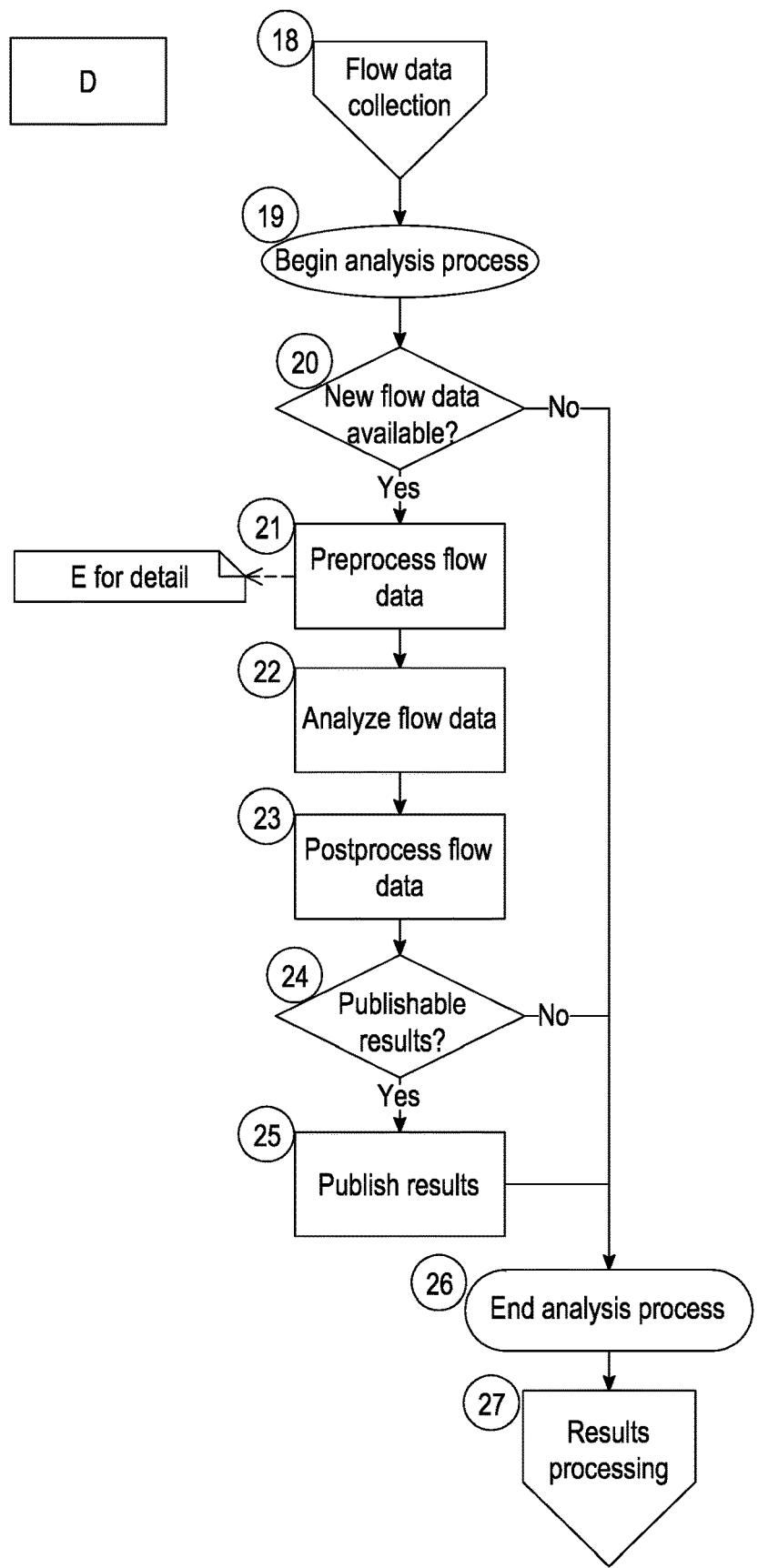
FIG. 4 shows an exemplary, non-limiting illustrative detailed process for flow analysis according to at least some embodiments of the present invention.

FIG. 4, also shown as D, which is referred to as item "D" in FIG. 3, provides more detail with regard to Flow Data Analysis 16. FIG. 4 relates to an exemplary detailed data analysis process. As shown again, there is provided a Flow Data Collection, or Collector 18, which collects the data. Optionally in this case this may be a functional Component representing collection of flow data from multiple Components, and optionally with preprocessing or without preprocessing.

In stage 19, the analysis process is begun, this for example may optionally include some type of preprocessing or collection of the data. In stage 20 it's determined whether new flow data is available. If new flow data is not available, then the process preferably goes directly to stage 26, in which the analysis process is ended, and any anomalous or other important results are sent to a Results Processing stage 27, which was previously described. Optionally and preferably only includes results which are termed to be important, anomalous, represent changes, or which may optionally be triggered according to one or more rules.

However when the new flow data is available in stage 20, then the process continues to stage 21, with preprocessing of the flow data. This preprocessing stage is described in greater detail with regard to Drawing E. The preprocessing stage preferably adds more metadata in the form of flow data columns to the flow data. The preprocessing and tagging is important for the present invention, at least some embodiments, because this relates to a method in which the data being examined may be pre-analyzed or preprocessed in a way so as to reduce the amount of computational resources required, and/or to distribute these computational resources in a way which may be more easy to implement, and at the very least which is more flexible and allows different appliances and/or computational devices or Components within the system to assume different aspects of the processing method, and/or of any type of analysis.

After preprocessing is done, then in stage 22, the flow data is analyzed. After analyzing the flow data, it is post-processed in stage 23. If publishable results are found in stage 24, then the results are published in stage 25. In either case, whether there are or not publishable results, and if there are publishable results after publication, the process of analysis has ended in stage 26 as previously described.

Figure 5:
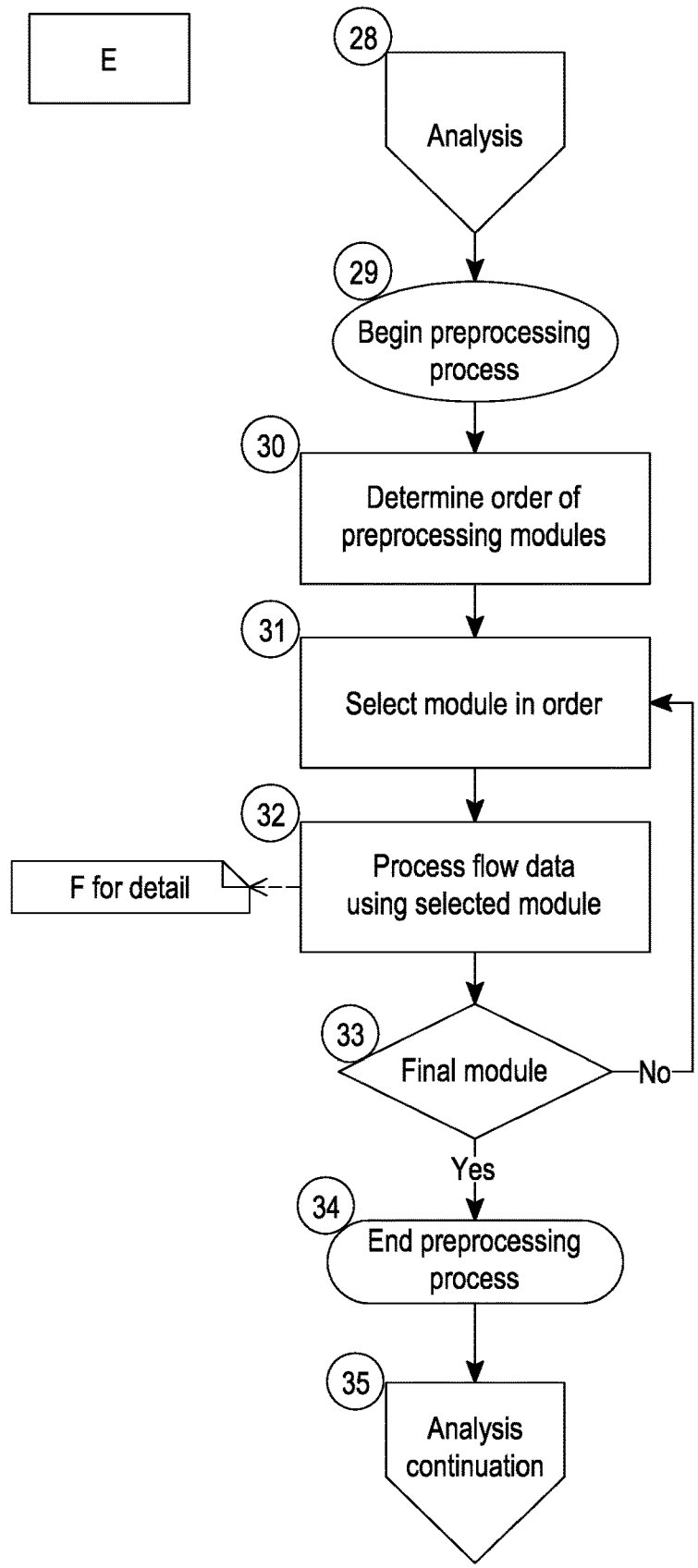
FIG. 5 shows an exemplary, non-limiting illustrative detailed process for flow data preprocessing according to at least some embodiments of the present invention.

FIG. 5 relates to Drawing E, which describes the preprocessing of the flow data in more detail. So, in FIG. 5 as shown in stage 28, analysis is performed of the data, in order to determine the type of data received, and to confirm that the data is amenable to processing. In stage 29, the preprocessing process actually begins. In stage 30, the order of the preprocessing modules is determined. This may optionally be determined at least partially according to one or more characteristics of the data, and/or according to one or more rules which may have been implemented previously. These rules may also optionally be triggered by one or more characteristics of the data.

For preprocessing, it is assumed that there are one or more modules that each have a specific preprocessing task in analyzing the flow data. Since modules can be dependent on the existence of specific tags, it is important to schedule the order of module executions, so as to maximize the amount of tagging that can be done. Such scheduling also prevents circular dependencies in infinite loops. So, for example if one module depends on the results of another module, then clearly the module which is dependent on the results of the other module needs to be implemented after the module which will provide the results.

If scheduling is sufficiently advanced and/or if sufficient information is provided, parallel execution may be scheduled. The scheduling is preferably done in stage 30.

In stage 31, each module for preprocessing, which is preferably a dedicated preprocessing module (dedicated to a particular simple or compound tagged element), is selected in the determined order. As noted previously, the determined order preferably relates to which information is required by each module. For example, if a module only requires a standard network flow element, it could optionally operate first. Modules that require an already tagged element would preferably operate later on, after the required tagged element was prepared.

Next in stage 32, the flow data is preprocessed using the selected module. This process is shown in Drawing F for more detail. In stage 33, it is determined whether each module has actually been implemented for preprocessing to preprocess the flow data. If not, then the flow returns to stage 31. If so, and all modules have actually been implemented, then in stage 34, the preprocessing process ends, and in stage 35, the analysis process preferably continues.

Figure 6:
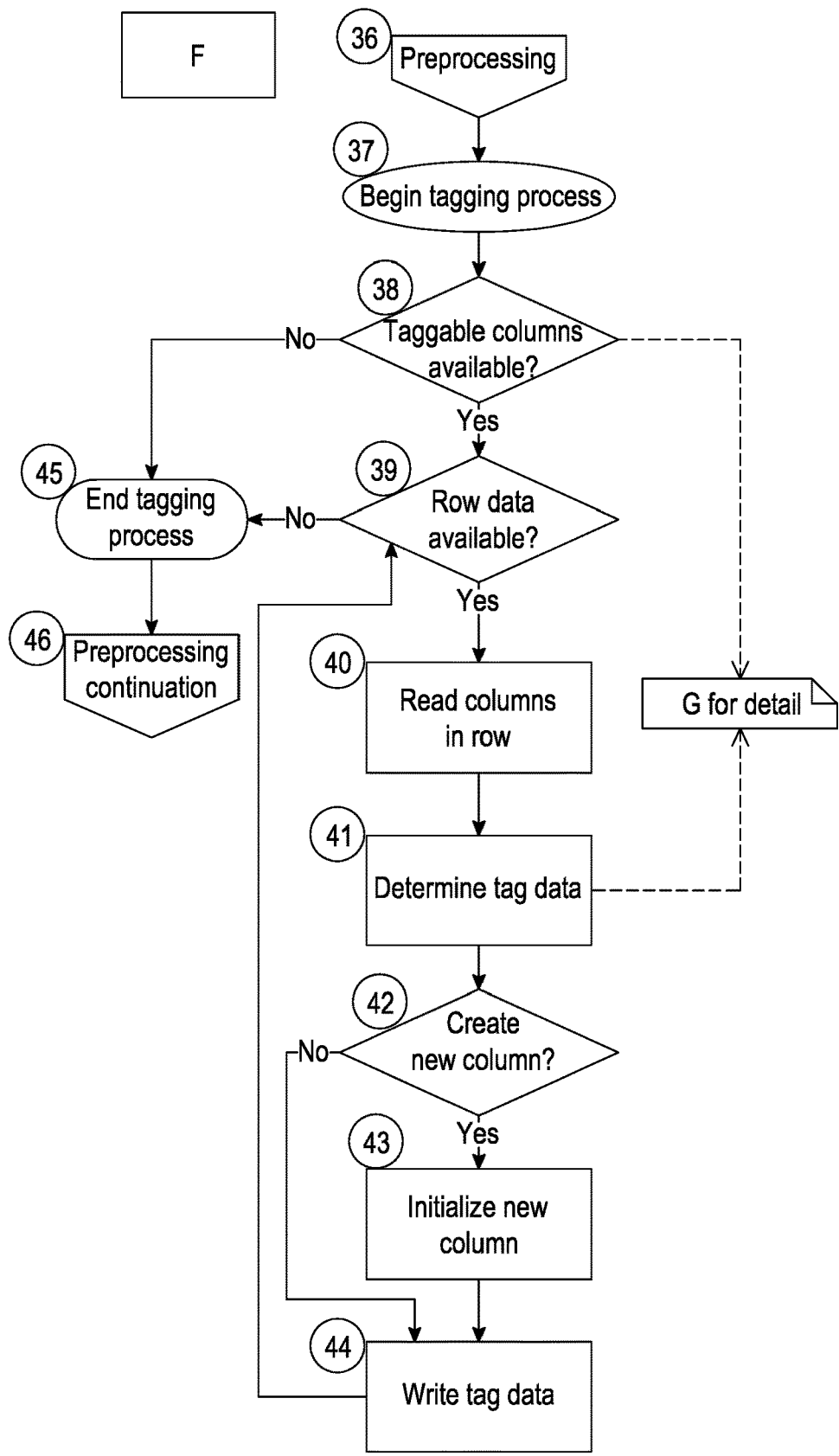
FIG. 6 shows an exemplary, non-limiting illustrative detailed process for flow data processing according to at least some embodiments of the present invention.

Now turning to FIG. 6, a method is shown as drawing F, which relates to the stage of preprocessing by each module in more detail. So as shown, in the preprocessing activity stage 36, then execution of a module in the tagging process starts in stage 37. First it is determined if all columns needed for this module are available in stage 38. Each module optionally needs at least one column to add or update metadata or tags. In the case of there not being a column, or as a precondition, the tag could consist of a timestamp or a sequence number or anything that does not need the context of this specific set of flow data.

If there are no taggable columns available, then execution of this module ends in stage 45, and the preprocessing continues with either another module, or the execution continues with another phase in stage 46. If the required columns are available, then an iterative loop starts for each row in those columns. So, continuing in more detail, in stage 38 it is determined that taggable columns are available, and again if there aren't taggable columns available, it shows that the tagging process ends in stage 45. However, this may only optionally be the process for this particular module, and in fact it may be necessary to reschedule a particular module in terms of its order, to execute it later on in the process, or possibly even in a different process if in fact the module is waiting for results.

Optionally and preferably the system is flexible enough so that if a particular module has been shown to be executed out of order, the module may optionally be executed in a different part of the order in a later iteration of the preprocessing, so as to avoid having to reschedule modules more than once. Of course, this may not be possible in all instances, in which case module rescheduling may optionally occur to be certain that all modules are actually executed.

Once it has been determined that taggable columns are available, then in stage 39 it is determined whether row data is available. If row data is available, then in stage 40, the columns in each row are preferably read. According to at least some embodiments of the present invention, the preprocessing method operates by column rather than by row, so that each cell in each column is completely read before the next column is considered, rather than reading each row as a separate entity. In the latter case, each cell and each row will correspond to a different column, such that cells from multiple columns are read per row, before the next row is considered. In this case however, as the cells come from one column, cells from multiple rows are considered before the next column is considered.

Next in stage 41, the tag data is determined. The determining process for the tag data is preferably described in more detail with regard to Drawing G. In stage 42, if a new result column needs to be created, then it is created, and it is initialized in stage 43.

The tag data is written in stage 44, and then the process continues back to stage 39 until a column has been completely finished. After that, each column is finished, the tagging process may optionally then continue with a different module, or optionally with a different column, until the tagging process has ended, as shown in stage 45. In stage 46, the preprocessing process preferably has its continuation with the next module.

Determination of the value of the tag may optionally be performed through lookup tables of one or more columns, through calculations or logical induction/inference and/or more complicated algorithms using different databases. Preferably the tagging process does not generate any conclusions on the significance in any context of the values of a row, or of combinations of rows. The tagging process preferably indiscriminately processes each eligible row, and adds a tag without processing the whole.

If the tag data needs to be written into a new column 42, as previously described, then that column needs to be created or initialized in stage 43.

Figure 7:
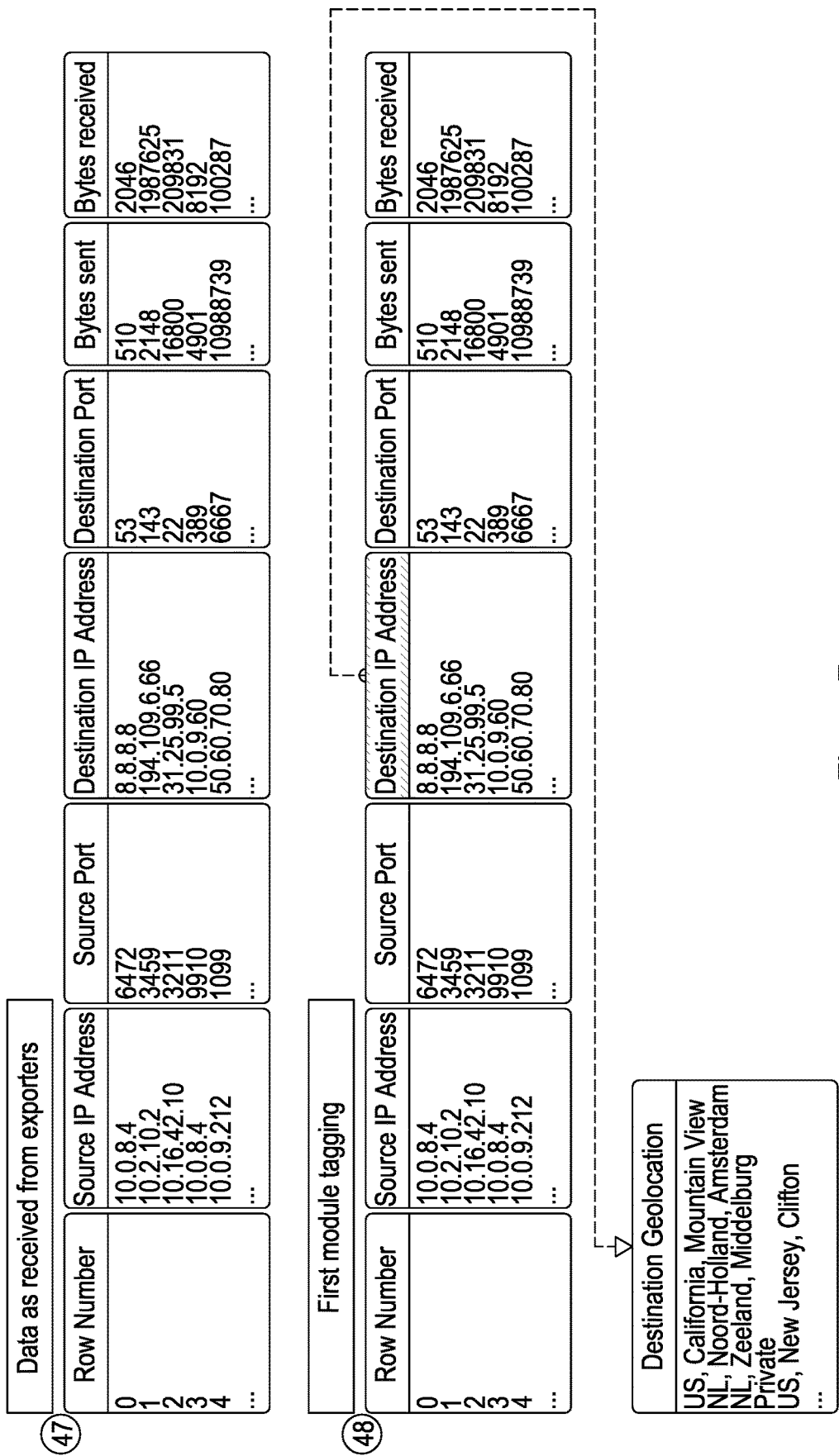
FIG. 7 shows an exemplary, non-limiting illustrative detailed process for flow element tagging according to at least some embodiments of the present invention.

FIG. 7 shows an exemplary, non-limiting illustrative detailed process for flow element tagging according to at least some embodiments of the present invention, in regard to a non-limiting example of network flow data as it is processed to form tagged data. The data is given as a non-limiting, illustrative example. Data is received by the flow collector and stored in the intermediate storage as columns of specific types of flow metadata (47). In this example are some common but non-limiting examples of flow data attributes.

The first module that starts tagging (48) looks at the column of 'Destination IP Address' and by doing a lookup in a specific table it determines the registered physical location for that IP address. This data is written to a new column called 'Destination Geolocation', as an example of a simple tagged element.

The second module that starts tagging (49) again uses the column 'Destination IP Address', but it also uses an internal database that keeps track of how often an IP address has been visited. It increments the value in the internal database, stores that value in the database and writes the data to a new column called 'Frequency', as another example of a simple tagged element.

The third module (50) uses the columns 'Bytes sent' and 'Bytes received' and then, using the formula (sent/received)×1000000 calculates the traffic ratio and puts that value in the new column 'Traffic ratio', as another example of a simple tagged element.

The fourth module (51) uses the columns 'Source IP Address' and 'Destination Port' and an internal database to determine a measure of that combination being an anomalous outlier from previous activity of that source IP address. That measure is written to the new column 'Anomalous', as an example of a compound tagged element.

The fifth module (52) uses 'Destination Port' and 'Traffic ratio' to add or subtract from the value already present in the column 'Anomalous'. The result is updated in the existing column 'Anomalous', or optionally in a new column, as an example of a compound tagged element.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for analyzing a computer network flow from a network, comprising a network flow exporter for preparing a network flow, received from the network; a network flow analyzer for decomposing said network flow received from said network flow exporter into a plurality of network flow standard elements; a flow tagger for tagging the plurality of network flow standard elements received from said network flow analyzer to form tagged elements, wherein said tagged elements are derived from said plurality of network flow standard elements; and a result processing component for processing said tagged elements, said result processing component comprising at least one of a malware detection application, an unauthorized access detection application, an anomaly detection application, or a compromise detection application for determining whether a computer has been compromised, wherein said operations are performed by a network device, a network appliance or a server; wherein said tagged elements comprise compound tagged elements that are derived from at least one of: a combined analysis of a plurality of simple tagged elements, a combined analysis of a simple tagged element plus information external to the network flow, an analysis obtained by performing a calculation on the simple tagged element, or an analysis obtained by combining a network flow standard element with said simple tagged element; wherein each simple tagged element is derived from at least one of said network flow standard elements through application of a source of information external to said network flow to said at least one of said network flow standard elements or according to a calculation performed on least one of said network flow standard elements, or a combination thereof.

2. The system of claim 1, wherein said tagged elements comprise compound tagged elements that are derived from a combination of a plurality of simple tagged elements.

3. The system of claim 1, wherein said compound tagged elements are derived from a simple tagged element plus information external to the network flow.

4. The system of claim 1, wherein said compound tagged elements further include a calculation on a simple or compound tagged element (or both), information external to the network flow, a plurality of compound tagged elements or a combination thereof.

5. The system of claim 1, wherein said tagged elements comprise at least one simple tagged element and at least one compound tagged element, and wherein said flow tagger tags the plurality of network flow standard elements iteratively, such that said at least one compound tagged element is determined after said at least one simple tagged element.

6. The system of claim 5, wherein said tagging is performed in an iterative order determined according to a tagging dependency between the plurality of elements.

7. The system of claim 1, wherein said simple tagged element is selected from the group consisting of a traffic ratio, derived from the amount of data sent to, and received from, a particular IP address or a particular port of particular IP address; and a port/IP address element, derived from the source IP address and the destination port of the network flow.

8. The system of claim 1, wherein said network flow standard element is determined according to one or both of the IPFIX or Netflow standards.

9. The system of claim 1, wherein said source of information external to the network flow comprises a look-up table for matching a value of a tagged element to an external information value.

10. The system of claim 9, wherein said look-up table comprises geolocation information and said tagged element comprises an IP address.

11. A method for analyzing a network flow, the network flow comprising a plurality of packets having a common set of properties, the method being performed by the system of claim 1, the method comprising: a. receiving a network flow, wherein said network flow comprises a plurality of packet properties organized into columns, each property in a column; b. analyzing the network flow to decompose the network flow into a plurality of elements; c. tagging the plurality of elements in an iterative order determined according to a tagging dependency between the plurality of elements; and d. writing the tagged elements by column.

12. The method of claim 11, wherein said analyzing the network flow comprises determining simple tagged elements first, before then determining compound tagged elements; wherein said simple tagged elements are derived from at least one of said network flow standard elements according to a source of information external to said network flow or according to a calculation, or a combination thereof; and wherein said compound tagged elements are derived from a combination of a plurality of simple tagged elements.

13. The method of claim 12, wherein said analyzing the network flow further comprises mapping each type of tagged element to a column of a record of tagged elements for the network flow; and determining an order of said columns according to tagging dependencies.

14. The method of claim 11, wherein said plurality of packet properties is selected from the group consisting of a packet header field element, a measured property of the plurality of packets, interpreted information based on packet contents, and meta-information.

15. The system of claim 1, wherein the network flow comprises a plurality of packets having a common set of properties, said network flow analyzer determining said network flow standard elements according to said common set of properties organized into a plurality of columns, each property in a column; and wherein said flow tagger tags the plurality of elements in an iterative order determined according to a tagging dependency between the plurality of elements.

16. The system of claim 15, wherein said plurality of packet properties is selected from the group consisting of a packet header field element, a measured property of the plurality of packets, interpreted information based on packet contents, and meta-information.

17. The system of claim 1, wherein said flow tagger comprises a plurality of tagging modules, and wherein said tagging modules are executed according to a tagging dependency between the plurality of elements.

18. The system of claim 17, wherein said flow tagger determines that at least one of said plurality of tagging modules needs to be rescheduled for execution according to said tagging dependency, such that at least one of said plurality of tagging modules is executed after at least one other of said plurality of tagging modules according to said rescheduling.

19. The system of claim 1, wherein said network comprises a local network.

20. The system of claim 1, wherein said tagged elements are indicative of a change in a status of the network.

21. The system of claim 1, comprising a flow data storage, in communication with the network flow analyzer, for storing the network flow.

22. The system of claim 1, wherein said flow tagger comprises a plurality of tagging modules, and wherein said tagged elements are derived from said plurality of network flow standard elements by the plurality of tagging modules.

23. The system of claim 22, wherein each of the plurality of tagging modules execute a respective tagging task on said plurality of network flow standard elements to derive said tagged elements.

24. The system of claim 23, wherein scheduling of said plurality of tagging modules to execute the respective tagging task is based on a tagging dependency between the plurality of elements.

25. The system of claim 1, wherein said tagged elements comprise simple tagged elements that are derived from at least one of said network flow standard elements according to a calculation.

26. A method for analyzing a computer network flow from a network in a plurality of operations, the method comprising
preparing a network flow received from the network with a network flow exporter;
decomposing said network flow received from said network flow exporter into a plurality of network flow standard elements by a network flow analyzer;
tagging the plurality of network flow standard elements received from said network flow analyzer by a flow tagger to form tagged elements, by deriving said tagged elements from said plurality of network flow standard elements, wherein said deriving said tagged elements comprises deriving compound tagged elements, wherein said deriving said compound tagged elements comprises at least one of:
analyzing in combination a plurality of simple tagged elements;
analyzing in combination a simple tagged element plus information external to the network flow;
performing a calculation on the simple tagged element; or
combining a network flow standard element with said simple tagged element; and
processing said tagged elements with a result processing component, said result processing component comprising at least one of a malware detection application, an unauthorized access detection application, an anomaly detection application, or a compromise detection application for determining whether a computer has been compromised;

wherein deriving each simple tagged element from at least one of said network flow standard elements comprises applying a source of information external to said network flow to said at least one of said network flow standard elements, by performing a calculation on least one of said network flow standard elements, or a combination thereof; and wherein said operations are performed by a network device, a network appliance or a server.

* * * * *